Figure 1:
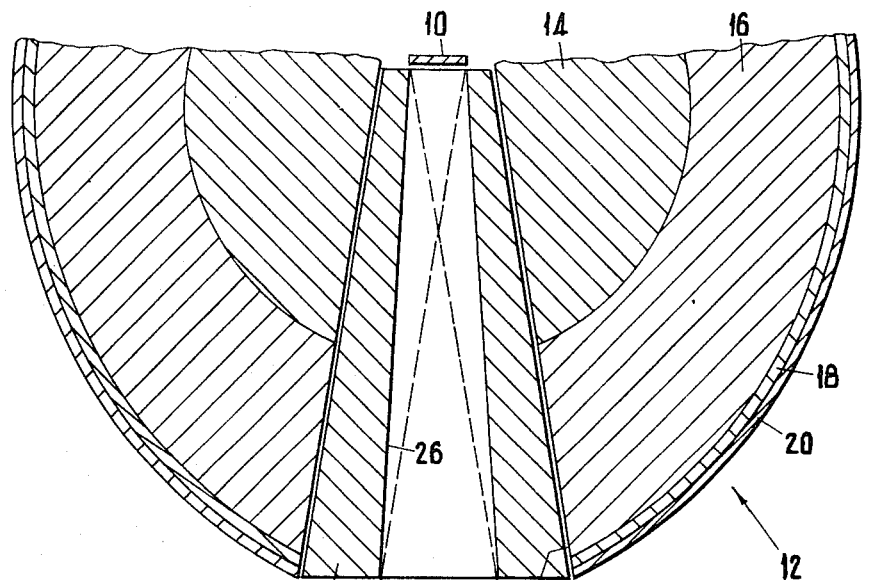

United States Patent [19]

Lundberg

[11] 3,781,564
[45] Dec. 25, 1973

[54] NEUTRON BEAM COLLIMATORS
[75] Inventor: Derek Anthony Lundberg, Hatfield, England
[73] Assignee: Elliott Brothers (London) Limited, Marconi House, New St. Chelmsford, England
[22] Filed: Feb. 28, 1973
[21] Appl. No.: 336,621

[52] U.S. Cl............................ 250/505, 250/518
[51] Int. Cl........................... H01j 1/52, H01j 35/16
[58] Field of Search.................. 250/503, 505, 508, 250/509, 510, 511, 518, 499

[56] References Cited
UNITED STATES PATENTS
3,257,560   6/1966   Jones............................... 250/505
3,487,218   12/1969   Kregs et al......................... 250/505

Primary Examiner—James W. Lawrence
Attorney—Morris Kirschstein et al.

[57] ABSTRACT

A neutron beam collimator comprising a matrix of epoxy resin loaded with particles of tungsten for moderating the neutrons, and with particles of a hydrogenous material for further moderating and capturing the neutrons. A layer of lead is provided to attenuate gamma radiation produced during neutron capture. A slow-neutron absorbing material is intimately mixed with the tungsten to reduce collisions between slow neutrons and the tungsten atoms, thereby avoiding induced radioactivity in the tungsten.

15 Claims, 3 Drawing Figures.

NEUTRON BEAM COLLIMATORS

This invention relates to neutron beam collimators, and is particularly, although not exclusively, concerned with collimators for use in neutron therapy equipment.

In neutron therapy equipment, for example, it is required to produce a neutron beam having a restricted cross section. For this purpose, a neutron collimator is used, consisting, for example, of a body of suitable material having a bore through which neutrons can be passed and which generally defines the cross-section of the neutron beam. Such a collimator may be formed as a removable portion of a shield which surrounds the neutron source. This allows the collimator to be interchanged with others having differently sized bores, in order to produce beams of different cross-sections.

The design of neutron collimators presents considerable difficulties since neutrons are extremely penetrating compared with X-rays, gamma rays, or electrons. For example, whereas a disphragm (e.g., of lead) a few centimetres thick might be used as a shield for a beam of X-rays or gamma rays, a 15 MeV neutron beam would require a diaphragm at least 50 centimetres thick to produce the same shielding effect. Moreover, scattering processes are much more significant with neutrons than with X-rays or gamma rays. A further difficulty is that neutron activation causes some materials to become unduly radioactive, which may present a hazard to users of the equipment.

One object of the present invention is to provide a novel form of neutron collimator.

According to a first aspect of the invention, a neutron beam collimator for a beam of neutrons of a predetermined energy, comprises a body of material containing: tungsten for moderating the energies of those neutrons by inelastic collision processes; a slow-neutron-absorbing material intimately mixed with the tungsten for reducing collisions between slow neutrons and the tungsten atoms; a hydrogenous material for further moderating the neutrons to thermal energies by elastic collision processes with the hydrogen atoms and for absorbing the thermal neutrons by capture processes, and a material having a high density of at least 10 grams / cm$^3$ for attenuating gamma radiation produced in the hydrogenous material during neutron capture processes, the collimator being of sufficient thickness to be substantially opaque to neutrons of said predetermined energy, and having a bore which, in use, generally defines the cross-section of the neutron beam.

Tungsten has a high macroscopic total neutron cross section of 0.35 cm$^{-1}$ and therefore is an effective neutron moderating material. (The macroscopic total neutron cross section of a material is a measure of the probability of an interaction of any kind between the material and a neutron passing through it). Moreover, tungsten is advantageous compared with other materials of high macroscopic total neutron cross section, e.g., iron, copper and nickel (having respective cross sections of 0.22 cm$^{-1}$, 0.24 cm$^{-1}$ and 0.24 cm$^{-1}$) which present problems of induced radioactivity by neutron activation. Thus, when tungsten is activated by neutrons, the most active product is $^{187}$W, with a specific gamma emission value of 3 and a maximum gamma energy of 0.6 MeV. By way of comparison, $^{56}$Mn, which is produced when iron is activated by neutrons, has a specific gamma emission value of 8.3 and a maximum gamma energy of 2.13 MeV.

This activity in tungsten is produced by slow neutrons, and is consequently reduced or suppressed by the slow-neutron-absorbing material that is intimately mixed with the tungsten. This slow-neutron-absorbing material may conveniently comprise boron, e.g., in the form of boron carbide.

The hydrogenous material may conveniently comprise polyethylene. The high density material may conveniently comprise lead, which does not present any significant problems of induced radioactivity.

Preferably, the tungsten and the slow-neutron-absorbing material are in the form of particles, bonded together in a matrix of bonding material. Conveniently, the hydrogenous material may also be in the form of particles bonded together in a matrix of bonding material.

In one, preferred form of the invention, the tungsten, the slow-neutron-absorbing material, the hydrogenous material and the high density material are all in the form of particles, bonded together in a matrix of bonding material. Conveniently, the particles of each of those materials are substantially uniformly distributed throughout the whole of the matrix. Preferably, however, the particles of tungsten, hydrogenous material, and high density material may be grouped into respective layers withing the matrix, with the bore passing through those layers in the order specified.

In another form of the invention, the high density material may be in the form of a solid layer of material, the tungsten, the slow-neutron-absorbing material and the hydrogenous material being in the form of particles, bonded together in a matrix of bonding material. In this case, the particles of tungsten and hydrogenous material may either be grouped into respective layers within the matrix, or substantially uniformly distributed through the matrix.

The bonding material may conveniently comprise a hydrogenous material, preferably epoxy resin. Alternatively, the bonding material for the tungsten particles, where these are grouped in a separate layer, may comprise a high density material, e.g., lead.

According to a second aspect of the invention, a neutron irradiation apparatus comprises a source of neutrons, a shield surrounding the source and having an aperture formed therein, and a collimator according to the first aspect of the invention adapted to fit within the aperture in the shield, in such a manner that neutrons from said source pass through the bore of the collimator to form a beam of restricted cross section.

Figure 2:
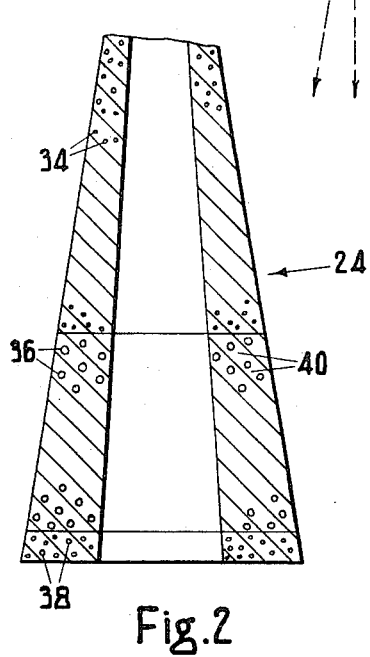
Figure 3:
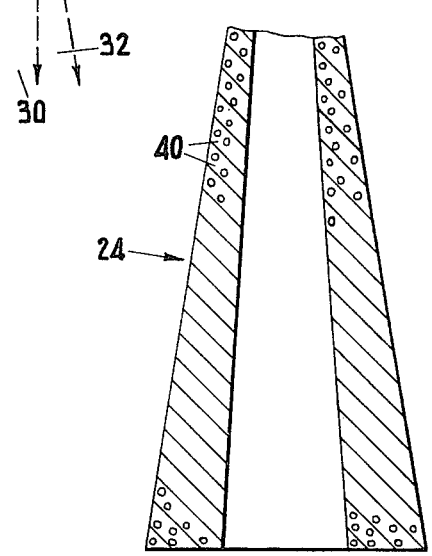

Embodiments of the invention will now be described by way of example, with reference to the drawing accompanying this Specification, of which:

FIG. 1 is a schematic sectional elevation of part of a neutron irradiation apparatus; and FIGS. 2 and 3 are schematic sectional elevations of two collimators for the apparatus of FIG. 1 in accordance with the invention.

Referring to FIG. 1, a neutron irradiation apparatus, e.g., for neutron therapy, comprises a neutron source 10 (for example a target arranged to be bombarded with particles from a particle accelerator) producing 15 MeV neutrons. The source 10 is surrounded by a shield 12, having a thickness of 50 centimetres, in the region of the source 10. The shield 12 comprises an inner layer 14 of iron, having a thickness equal to approximately two-thirds of the total radial thickness of the shield, surrounded by a hydrogenous layer 16 of polyethylene granules and boron carbide in oil, contained within a steel case 18, with a 1 centimetre thick lead outer layer 20.

The neutron interactions occurring within the shield are complex, but broadly speaking the inner layer 14 acts primarily to slow down the primary 15 MeV neutrons by inelastic collision processes. When the mean neutron energy has fallen to below about 1 MeV these processes become less efficient, and further shielding is therefore effected by the hydrogenous layer 16 which, by elastic collision processes, further moderates the neutron energy to thermal levels. Finally, the neutrons are captured in the hydrogenous layer by capture processes. The lead outer layer 20 attenuates gamma radiation which is produced in the hydrogenous layer from the capture processes.

The boron (in the boron carbide) helps to minimise the intensity of the capture gamma radiation in the hydrogenous layer.

The shield 12 has an aperture 22. A neutron beam collimator 24 fits within this aperture, the collimator having a bore 26 of generally rectangular cross-section which generally defines the cross section of a neutron beam 28 emitted from the apparatus. If it is desired to vary the cross-section of the beam 28, the collimator 24 may be removed and replaced by a similar collimator but with a different size of bore.

The beam 28 emerging from the collimator 24 has a main field region 30, which includes neutrons from all parts of the source 10. Thus, the neutron intensity is substantially uniform over this region 30. Outside the main field region 30 there is a geometric penumbra region 32, due to the extended size of the source 10, over which region 32 the neutron intensity gradually drops to zero. The penumbra is extended by neutrons which are scattered from the material of the collimator, and also by neutrons which pass through the collimator material without being stopped by it. Material closest to the neutron source 10 is most significant as far as scattering is concerned, and some reduction of the penumbra intensity may be obtained by using a slightly shorter collimator, leaving a gap between the source 10 and the end of the collimator.

It will be seen that the collimator should be designed to reduce the intensity in the penumbra region as much as possible, so that the main field region 30 is as sharply defined as possible.

Referring to FIG. 2, in a first example of the invention, the collimator 24 comprises a matrix 40 of bonding material loaded to form three layers 34, 36 and 38. The first layer 34 is loaded with tungsten powder and boron carbide powder, preferably in such proportions as to give a boron-to-tungsten atom ratio of at least 1:1, and an overall density of at least 3 grams/cm³. As explained above, tungsten is a particularly advantageous choice of material for this purpose, since it has a high macroscopic total neutron cross section and is protected by the boron from excessive induced radioactivity, which would present a hazard to the radiographer.

For example, the layer 34 may be loaded with tungsten powder and boron carbide powder in the proportions 15 kilograms of tungsten to 2.5 kilograms of boron carbide. This produces a boron-to-tungsten atom ratio of more than 2:1, and an overall density in the range 4.5–5 grams/cm³.

The second layer, 36 is loaded with particles of a hydrogenous material, preferably high density polyethylene granules. These granules are packed so as to give substantially a maximum packing density without being mechanically compressed. Boron carbide may also be added to this layer to help to minimise the intensity of capture gamma radiation from this layer. This boron carbide may be mixed in with the bonding material, or may be coated on to the polyethylene granules, using an adhesive.

The third layer 38 is loaded with particles of a high density material, e.g., lead shot or powder, to give an overall density of 6 grams/cm³.

The bonding material is preferably epoxy resin, which itself has a relatively high hydrogen atom density (approximately $7.2 \times 10^{22}$ atoms per cm³), is easily moulded, and is suitably robust to withstand wear and tear in use.

Typically, the total length of the collimator is 50–60 centimetres, this being sufficient to ensure that the material of the collimator is substantially opaque to 15 MeV neutrons, (giving a transmission factor of approximately 1 percent in this case) and ensures that good beam definition is produced. This first layer 34 may be one-third to two-thirds of the total length. The third layer 38 is typically 4 cm in thickness.

In a modification of the collimator shown in FIG. 2, the third layer 38 may be replaced by one of solid lead, 2cm. thick.

In another modification of the collimator of FIG. 2 the bonding material for the first layer 34 of the matrix 40 may be lead, the bonding material for the other layers being epoxy resin, as before. This produces a more sharply defined neutron beam, compared with the collimator of FIG. 3, and helps to suppress the radiation level from induced radio-activity, so that less boron carbide is required.

In a further modification of the collimator of FIG. 2, nickel powder may be added to the second layer 36, typically in an amount 5–15 kilograms for a 10cm × 10cm field collimator. This will significantly improve the beam definition, although it will give rise to increased induced radio-activity. However, this will be acceptable in some circumstances, e.g., in a collimator which would only be used occasionally.

Referring now to FIG. 3, in a further example of the invention, the collimator is similar to that shown in FIG. 2, but with each of the loading materials uniformly distributed throughout the matrix 40 of bonding material.

The performance of the resulting collimator is perhaps marginally worse than that of the collimator in FIG. 2, but not really significantly.

What I claim is:

1. A neutron beam collimator for a beam of neutrons of a predetermined energy, coprising a body of material of sufficient thickness to be substantially opaque to neutrons of said predetermined energy, and having a bore which, in use, generally defines the cross-section of the neutron beam, said body containing: tungsten for moderating the energies of the neutrons by inelastic collision processes; a slow-neutron-absorbing material intimately mixed with the tungsten for reducing collisions between slow neutrons and the tungsten atoms; a hydrogenous material for further moderating the neutrons to thermal energies by elastic collision processes with the hydrogen atoms and for absorbing the thermal neutrons by capture processes; and a material having a high density of at least 10 grams/cm³ for attenuating gamma radiation produced in the hydrogenous material during neutron capture processes.

2. A neutron beam collimator according to claim 1 wherein said slow-neutron-absorbing material comprises boron.

3. A neutron beam collimator according to claim 1 wherein said tungsten and said slow-neutron-absorbing material are in the form of particles, bonded together in a matrix of bonding material.

4. A neutron beam collimator according to claim 3 wherein said tungsten, said slow-neutron-absorbing material, said hydrogenous material, and said high density material are all in the form of particles, bonded together in a matrix of bonding material.

5. A neutron beam collimator according to claim 4 wherein said particles of tungsten, hydrogenous material and high density material are substantially uniformly distributed throughout the whole of said matrix.

6. A neutron beam collimator according to claim 4 wherein said particles of tungsten, hydrogenous material, and high density material are grouped into respective layers within said matrix, with said bore passing through the layers of tungsten, hydrogenous material, and high density material in that order.

7. A neutron beam collimator according to claim 6 wherein said layer of hydrogenous material also contains particles of nickel.

8. A neutron beam collimator according to claim 3 wherein said tungsten, said slow-neutron-absorbing material and said hydrogenous material are in the form of particles bonded together in a matrix of bonding material, and said high density material is in the form of a solid layer of material.

9. A neutron beam collimator according to claim 8 wherein said particles of tungsten and hydrogenous material are substantially uniformly distributed throughout the whole of said matrix.

10. A neutron beam collimator according to claim 8 wherein said particles of tungsten and hydrogenous material are grouped into respective layers within said matrix, with said bore passing through said layers of tungsten, hydrogenous material, and high density material in that order.

11. A neutron beam collimator according to claim 10 wherein said layer of hydrogenous material also contains particles of nickel.

12. A neutron beam collimator according to claim 3 wherein said bonding material comprises a hydrogenous material.

13. A neutron beam collimator according to claim 12 wherein said bonding material comprises epoxy resin.

14. A neutron beam collimator according to claim 3 wherein said bonding material for said particles of tungsten comprises a high density material.

15. A neutron beam collimator according to claim 14 wherein said bonding material for said particles of tungsten comprises lead.

* * * * *